(12) United States Patent
Seeds

(10) Patent No.: US 6,334,568 B1
(45) Date of Patent: Jan. 1, 2002

(54) DYNAMICALLY BALANCED DRIVESHAFT ASSEMBLY AND METHOD OF BALANCING SAME

(75) Inventor: Harold W. Seeds, Kalamazoo, MI (US)

(73) Assignee: American Axle & Manufaturing, Inc., Detroit, MI (US)

( * ) Notice: Subject to any disclaimer, the term of this patent is extended or adjusted under 35 U.S.C. 154(b) by 217 days.

(21) Appl. No.: 08/691,193

(22) Filed: Aug. 5, 1996

Related U.S. Application Data

(60) Provisional application No. 60/005,645, filed on Oct. 19, 1995.

(51) Int. Cl.[7] .................................................. B23K 20/12
(52) U.S. Cl. ........................................ 228/114.5; 464/180
(58) Field of Search .................................... 464/179, 180, 464/181, 183, 185; 74/573 R; 228/2.1, 2.3, 112.1, 113, 114.5, 175

(56) References Cited

U.S. PATENT DOCUMENTS

| | | | |
|---|---|---|---|
| 3,631,585 A | * 1/1972 | Stamm et al. | ............. 464/179 X |
| 4,887,989 A | 12/1989 | Kerecman | ...................... 464/180 |
| 4,895,551 A | 1/1990 | Fritz | ............................ 464/180 |
| 4,998,448 A | 3/1991 | Ellis, Jr. | ...................... 74/573 R |
| 5,722,896 A | * 3/1998 | Beagley et al. | .............. 464/180 |
| 5,778,737 A | * 7/1998 | Welsh et al. | ................ 74/573 R |

FOREIGN PATENT DOCUMENTS

| | | | | |
|---|---|---|---|---|
| DE | 1777597 U | 10/1958 | | |
| DE | 3035437 | 5/1982 | | |
| DE | 3140368 | * 1/1983 | ................. | 464/180 |
| EP | 520719 | * 12/1992 | ................. | 464/180 |
| GB | 465259 | * 6/1937 | ................. | 464/180 |
| GB | 1417266 | * 12/1972 | ................. | 464/180 |
| GB | 2090942 | * 7/1982 | ................. | 464/180 |
| GB | 2147388 | * 5/1985 | ................. | 464/180 |
| GB | 2272041 A | 5/1994 | | |

OTHER PUBLICATIONS

*Welding Handbook*, Sec. 3A, pp. 50.3 to 50.6, 50.11 to 50.14 and 50.30 to 50.33 (Am. Welding Socy. 1970) TS227.A5h.*

* cited by examiner

Primary Examiner—Lynne H. Browne
Assistant Examiner—Greg Binda
(74) Attorney, Agent, or Firm—Reising, Ethington, Barnes, Kisselle & McCulloch, P.C.

(57) ABSTRACT

An aluminum driveshaft assembly is dynamically balanced by locating steel plates at desired locations on an exterior surface of an aluminum driveshaft, inserting tapered aluminum studs through tapered holes of the aluminum or steel plates, and inertia or friction welding the bases of the aluminum studs to the exterior surface of the driveshaft to retain the steel plates. Alternatively steel plates with round cylindrical holes are attached to the driveshaft by round cylindrical studs. The cylindrical studs are friction welded to the driveshaft after the aluminum or steel plates are located on the driveshaft and steel plates with cylindrical holes are then inserted onto the studs. Cylindrical studs may also be friction welded before the aluminum or steel plates are added. In this case aluminum or steel plates are then added and the stud is rolled over in a secondary operation.

6 Claims, 1 Drawing Sheet

DYNAMICALLY BALANCED DRIVESHAFT ASSEMBLY AND METHOD OF BALANCING SAME

This application claims benefit of the filing date of and right of priority of United States Provisional Application No. 60/005,645 filed Oct. 19, 1995 under 35 USC §119(e).

BACKGROUND OF THE INVENTION

This invention relates generally to driveshaft assemblies for automotive land vehicles and more particularly to dynamically balanced driveshaft assemblies and methods for dynamically balancing such driveshaft assemblies.

Commercially produced driveshaft assemblies for automotive land vehicles generally comprise a thin walled tube having a yoke welded or otherwise suitably attached to each end. Due to manufacturing tolerances, these tubular driveshafts are neither perfectly round in cross section, absolutely straight throughout their length or exactly uniform in wall thickness. Small deviations in roundness, straightness and wall thickness result in dynamic imbalance that can cause excessive bearing loads during operation particularly at high speed.

Steel driveshaft assemblies are customarily dynamically balanced by welding small steel plates at the end or ends of the driveshaft where the thin walled is supported internally by a yoke and/or along the length of the driveshaft. Welding the small plates to the thin walled tubes can cause thermally induced distortions that result in bowing of the driveshaft and more imbalance.

Moreover, there is an increasing use of aluminum and aluminum based driveshafts and driveshaft components which do not weld as easily as steel. For instance, aluminum and aluminum based driveshafts and driveshaft components cannot be resistance welded. Furthermore, aluminum or aluminum based components are not easily welded to steel components. Consequently there is a need for new methods for attaching balancing weights to driveshafts, particularly steel or other heavy metal balancing weights to aluminum or aluminum based driveshafts or driveshaft components.

Recent proposals for attaching balancing weights to driveshafts include non-welding methods.

For instance, U.S. Pat. No. 4,998,448 granted to William P. Ellis, Jr. Mar. 12, 1991 discloses an aluminum driveshaft that is balanced by applying predetermined amounts of a balancing composition at selected locations on the outer surface of the driveshaft. The balancing composition includes a polymer carrier of an adhesive composition that is cured by ultraviolet light and a particulate material of higher density dispersed in the carrier. The material includes metal particles that have a particle size in the range of 0.080 to 0.120 inches and that comprise 90% to 94% of the balancing composition by weight.

U.S. Pat. No. 4,895,551 granted to Peter J. Fritz Jan. 23, 1990 discloses a fiber reinforced resin driveshaft that is dynamically balanced by applying a mass or patch of resin containing high density particles, such as metal particles to one or more locations on the drive shaft. Each patch extends only a portion of the circumference of the shaft and generally has an area less than 10 sq. inches, and generally has a thickness less than 1/16th inch. The small masses or patches of resin may be attached anywhere along the length of the driveshaft.

These two methods of attaching balancing weights to driveshafts eliminate the need for welding and the problems associated with welding aluminum or aluminum based components. However, these methods have their own drawbacks. For instance, the methods require the selection and preparation of a suitable balancing composition that bonds well to aluminum or aluminum based materials. This selection and/or preparation of a suitable balancing composition could be very difficult and in any event would be considerably more difficult and expensive than simply providing steel or other high density metal plates. Moreover the balancing must be dispensed in a precisely metered quantity at a precise location on the driveshaft and then cured. This adds to the complexity and expense of the process.

U.S. Pat. No. 4,887,989 granted to Norman C. Kerecman Dec. 19, 1989 discloses another driveshaft that is dynamically balanced without any need for welding. In this instance, the driveshaft is dynamically balanced by securing small curved metal plates to one or more locations along the length of the tubular driveshaft by blind rivets. The tubular driveshaft and the curved plates have aligned openings that receive the blind rivets from the exterior of the tubular shaft and then have their inner ends upset to provide a mechanical connection between the curved metal plates and the tubular shaft. A layer of adhesive is interposed between each curved metal plate and the tubular shaft to bond and seal the metal plate to the outer surface of the shaft. The metal plates may be attached anywhere along the length of the driveshaft.

This method of attaching balancing plates also eliminates the need for welding and the problems associated with welding. However, the method also has its own drawbacks. Attachment holes must be located and drilled through the wall of the tubular driveshaft at several locations. This tends to weaken the driveshaft. Furthermore the balancing plates must be bonded to the driveshaft so that water or other material cannot leak through the attachment holes and imbalance the driveshaft during service. This adds further complexity and expense.

It is also known that steel or other metal balancing plates can be attached to an aluminum or aluminum based driveshaft by fusion welding the balancing plates to the driveshaft. In this method, the balancing plates are drilled through to provide a well when the balancing plates are held against an exterior surface of the driveshaft. These wells are then filled with molten aluminum or aluminum based metal that welds easily to the driveshaft and forms secure mechanical fasteners for the steel balancing plates when cooled. While this method is successfully employed in many instances, it too has some drawbacks. For instance the wells are filled by consuming weld wire that is expensive. Furthermore, the method has a high scrap rate due to the tendency for the molten metal in the well of the balancing plate to burn through the tubular driveshaft if the process is not controlled very precisely.

SUMMARY OF THE INVENTION

The object of this invention is to provide a driveshaft assembly comprising an aluminum, aluminum or other metallic driveshaft that is dynamically balanced easily and economically.

A feature of the invention is that the driveshaft assembly is dynamically balanced without any need for drilling holes in the driveshaft.

Another feature of the invention is that the driveshaft assembly is dynamically balanced without any need for the selection, preparation and/or application of a balancing composition, slurry or paste.

Another feature of the invention is that the driveshaft assembly is dynamically balanced without any need for wells or large masses of molten material.

Still yet another feature of the invention is that the driveshaft assembly is dynamically balanced by simple steel or other high density metal plates that are securely attached to the driveshaft by studs that do not require drilled holes in the driveshaft, sealants, bonding materials nor large masses of molten material.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
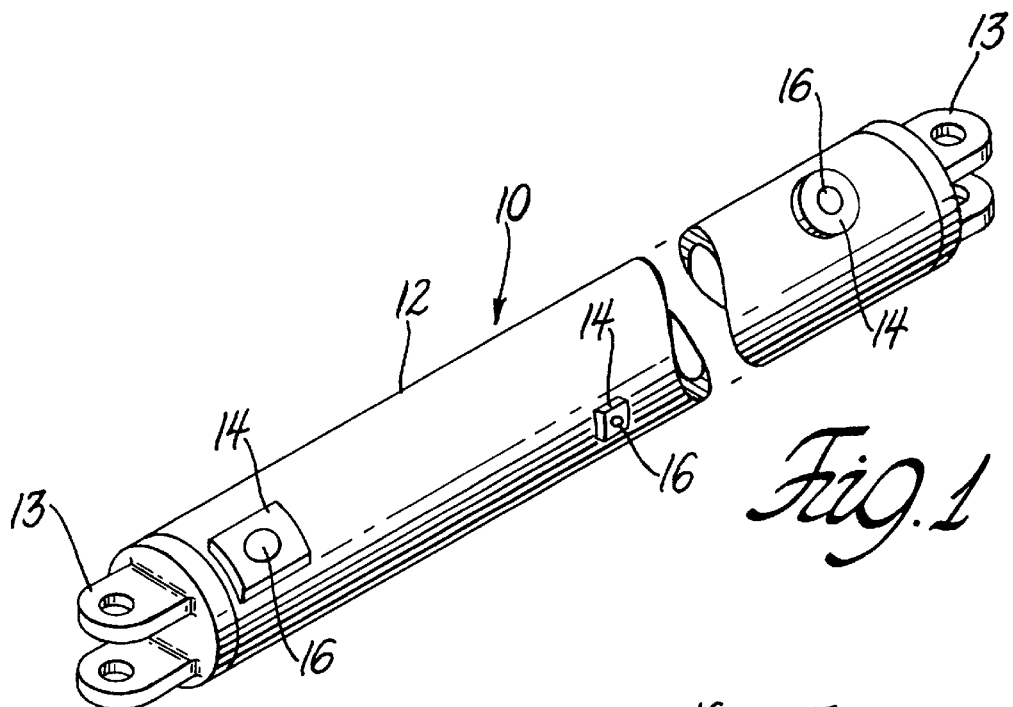
FIG. 1 is a perspective view of a dynamically balanced driveshaft assembly in accordance with the invention.

Referring now to the drawing, driveshaft assembly 10 comprises a tubular driveshaft 12 having yokes 13 at each end for installing the driveshaft assembly 10 in a motor vehicle. The tubular driveshaft 12 is preferably made of aluminum, aluminum alloy or other aluminum based material such as an aluminum metal matrix comprising an aluminum oxide in an aluminum alloy matrix. Such shafts are hereinafter collectively referred to simply as "aluminum" driveshafts. These aluminum driveshafts enjoy a weight advantage and other known advantages over their steel counterparts.

The driveshaft assembly 10 further includes a plurality of balancing weights 14 that are attached to the tubular driveshaft 12 for dynamically balancing the driveshaft assembly 10. The driveshaft assembly 10 is dynamically balanced in a well known manner using conventional techniques for determining the proper amount of weight and location for dynamically balancing the driveshaft to a given set of standards. However, the balancing weights 14 and the attachment of these balancing weights to the aluminum driveshaft 12 is unique.

The balancing weights 14 are made of a high density metal and are preferably and economically formed as simple steel plates. The steel plates 14 can have various geometric shapes such as the square, rectangular and circular shapes shown in FIG. 1. The steel plates 14, however, are preferably curved so that the plates conform to the exterior surface of the aluminum driveshaft 12.

Figure 2:
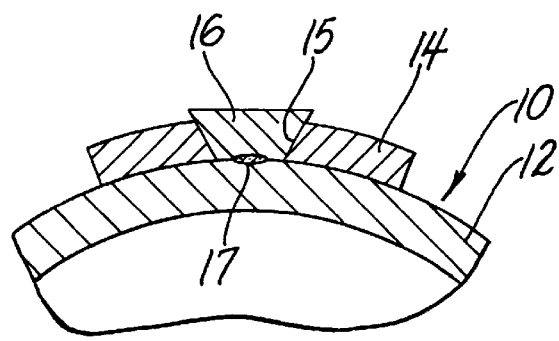
FIG. 2 is an enlarged fragmentary transverse section of the driveshaft assembly showing the attachment of a balancing weight to the driveshaft component of the assembly.

Each of the steel plates 14 has a central hole 15 that extends through the concavo-convex thickness of the plate. This hole which is used to attach the steel plate 14 to the tubular aluminum driveshaft 12 preferably tapers inwardly in a direction toward the concave side of the curved steel plate 14 that engages the exterior surface of the driveshaft 12 as shown in FIG. 2.

Each of the steel plates 14 is attached to the aluminum driveshaft 14 securely and accurately by a tapered stud 16.

The steel plate 14 is clamped in place on the aluminum driveshaft 14. The tapered stud 16 is then inserted through hole 15 and then inertia or friction welded to the aluminum driveshaft 12 so that a strong, solid weld is produced at the base of the stud 16 as indicated at 17 in FIGS. 2 and 3. A conventional friction stud gun such as a Ramstud or Nelson friction stud gun can be used for this purpose.

The tapered stud 16 is also made of an aluminum material such as aluminum 6061, 5356 or 4043 alloys. The driveshaft 12 is typically made of a heat treatable aluminum 6061 alloy. In such instance aluminum 6061 alloy is preferred for the tapered stud 16 because both will have the same metallurgical and mechanical properties. A stud made of any of the foregoing materials is hereinafter simply referred to an "aluminum" stud.

Figure 3:
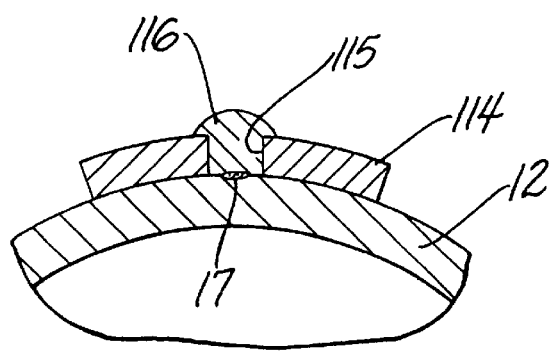
FIG. 3 is an enlarged fragmentary transverse section of the driveshaft assembly showing an alternate attachment of a balancing weight to the driveshaft component.

The use of a tapered stud in conjunction with a plate having a tapered hole is preferred because the plate can be attached to the driveshaft in a single operation. However, it is also possible to use an aluminum stud 116 of round cylindrical shape in conjunction with a steel plate 114 having a round cylindrical hole 115 as shown in FIG. 3. In this case, the aluminum stud 116 can still be inserted through the hole 115 of steel plate 114 while it is on the aluminum driveshaft 12 and then inertia or friction welded to the driveshaft as before. However, it is also possible to inertia or friction weld the aluminum stud 116 to the aluminum driveshaft 12 first and then insert the steel plate 114 onto the stud 116 after it has been attached to the driveshaft 12. In this case, the steel plate 114 is then attached to the aluminum driveshaft 12 securely by rolling over the top of the aluminum stud 116 in a secondary operation. This may be done by installing a steel collet in the friction gun described above.

Steel, aluminum or other metal plates 14 or 114 of any desired weight or size can be attached at any desired location along the length of the metal shaft by employing either of the above methods. Moreover, both are well suited to attaching weight plates to aluminum shafts in a simple and efficient manner that avoids the drawbacks of known methods as pointed out above.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention be practiced otherwise than as specifically described.

The embodiments of the invention in which an exclusive property or privilege is claimed are defined as follows:

1. A method of dynamically balancing a driveshaft assembly having a tubular member driveshaft comprising the steps of:

providing a plate having a concave surface and a hole that extends through the plate, friction welding a metal stud to a convex exterior surface of the tubular member driveshaft, inserting the metal stud into the hole of the plate after the metal stud is friction welded to the exterior surface of the tubular member driveshaft, and attaching the plate to the tubular member driveshaft with the concave surface of the plate engaging the convex exterior surface of the tubular member drive shaft by the metal stud that is friction welded to the exterior surface of the tubular member driveshaft.

2. The method as defined in claim 1 wherein a head of the metal stud is rolled over after the metal stud is inserted into the hole of the plate to attach the plate to the tubular member driveshaft.

3. The method as defined in claim 1 wherein the driveshaft and the stud are made of aluminum.

4. The method as defined in claim 3 wherein the plate is made of steel or aluminum.

5. A method of dynamically balancing a driveshaft assembly having a tubular member driveshaft that is made of aluminum comprising the steps of:

providing a metal plate having a concave surface and a hole that extends through the metal plate, friction welding an aluminum stud to an exterior convex surface of the tubular member driveshaft, inserting the aluminum stud into the hole of the metal plate after the aluminum stud is friction welded to the exterior surface of the tubular member driveshaft, and attaching the metal plate to the tubular member driveshaft with the concave surface of the metal plate engaging the convex surface of the tubular member driveshaft by the aluminum stud that is friction welded to the exterior surface of the tubular member driveshaft.

6. The method as defined in claim 5 wherein the metal plate is made of steel or aluminum.

* * * * *

UNITED STATES PATENT AND TRADEMARK OFFICE
CERTIFICATE OF CORRECTION

PATENT NO.    : 6,334,568 B1
DATED         : January 1, 2002
INVENTOR(S)   : Seeds It is certified that error appears in the above-identified patent and that said Letters Patent is hereby corrected as shown below:

Column 1,
Line 27, after "walled" insert therein -- tube --.
Line 52, before "material" insert therein -- particulate --.

Column 2,
Line 10, after "balancing" insert therein -- composition --.
Line 55, after "aluminum" insert therein -- based --.

Column 4,
Line 25, after "it is" insert therein -- supported --.
Line 53, after "invention" insert therein -- may --.

Signed and Sealed this

Third Day of September, 2002

Attest:

JAMES E. ROGAN
Attesting Officer          Director of the United States Patent and Trademark Office